L. AND H. NILSON.
GEAR TRANSMISSION.
APPLICATION FILED JAN. 8, 1918.

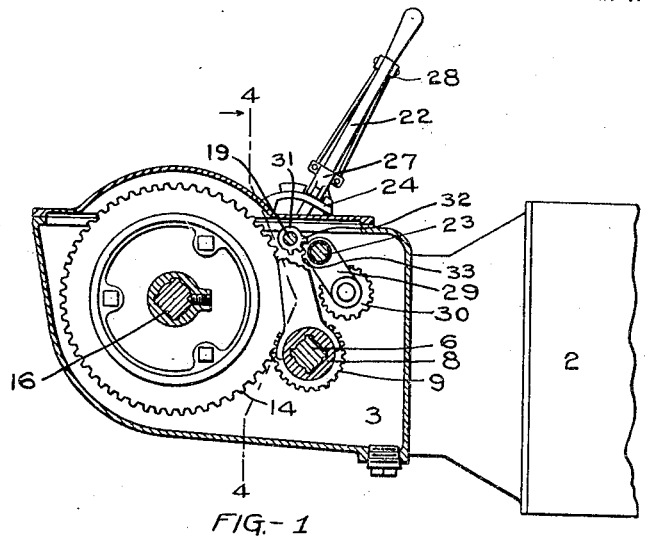
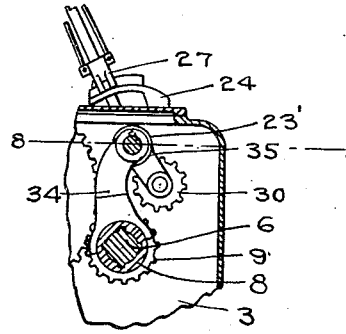
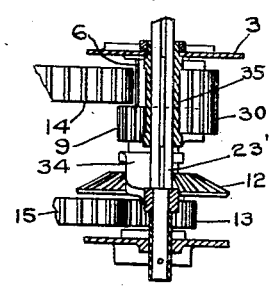
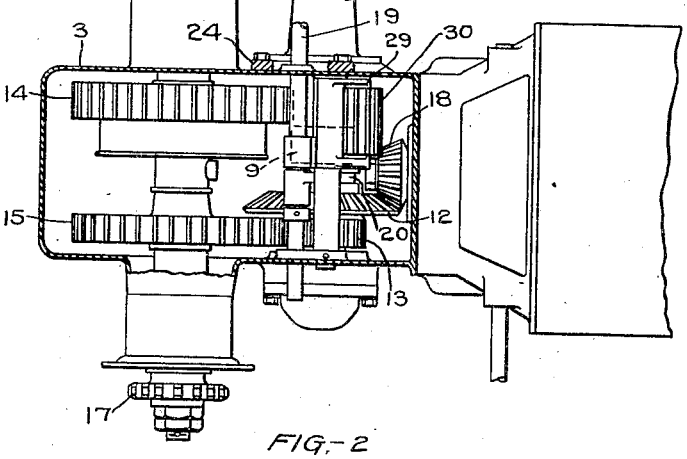

1,363,906.

Patented Dec. 28, 1920.
2 SHEETS—SHEET 2.

WITNESSES:
D. G. Hall
J. E. Sorensen

INVENTORS:
LEONARD NILSON.
HAROLD NILSON.
BY
Paul Paul
ATTORNEYS

UNITED STATES PATENT OFFICE.

LEONARD NILSON AND HAROLD NILSON, OF WAYZATA, MINNESOTA.

GEAR TRANSMISSION.

1,363,906.  Specification of Letters Patent.  Patented Dec. 28, 1920.

Application filed January 8, 1918. Serial No. 210,925.

*To all whom it may concern:*

Be it known that we, LEONARD NILSON and HAROLD NILSON, citizens of the United States, residents of Wayzata, county of Hennepin, State of Minnesota, have invented certain new and useful Improvements in Gear Transmission, of which the following is a specification.

The object of our invention is to improve the transmission gearing shown and described in Letters Patent of the United States No. 1,193,591, issued August 8, 1916, to us, the particular object being to provide a shifting mechanism for the gearing which will necessitate the adjustment of the operating lever in a neutral position before it can be moved to reverse.

Other objects of the invention will appear from the following detailed description.

The invention consists generally in various constructions and combinations, all as hereinafter described and particularly pointed out in the claims.

Figure 3:
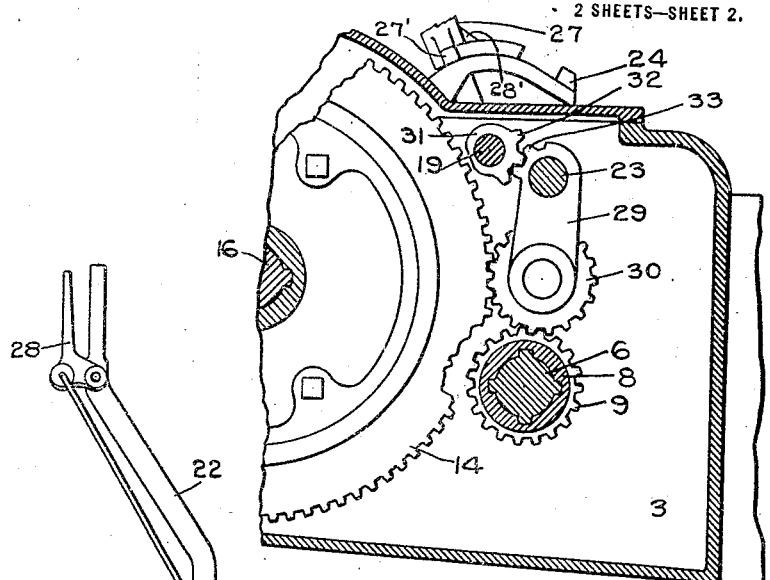
Figure 4:
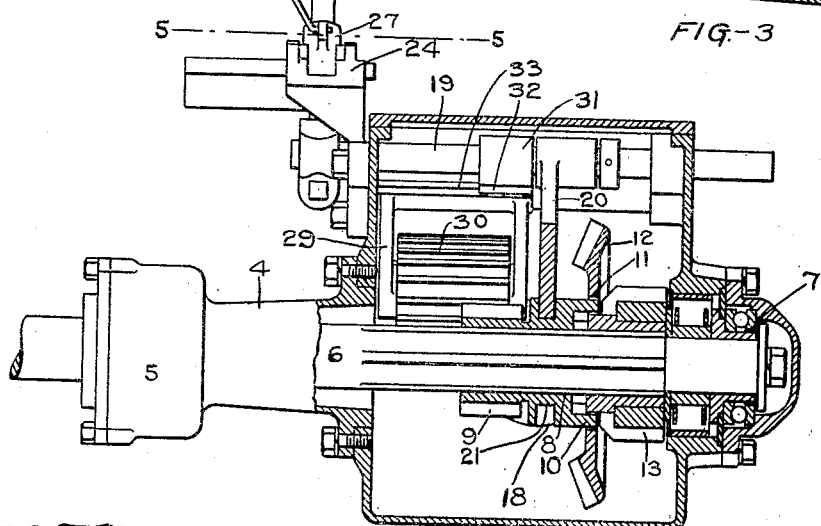
Figure 6:
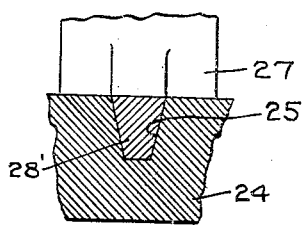
Figure 5:
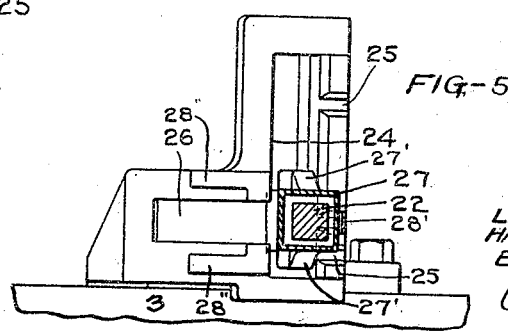

In the accompanying drawings forming part of this specification,

Figure 1 is a sectional view, showing the transmission in its neutral position,

Fig. 2 is a horizontal sectional view, showing the relative position of the gears, Fig. 3 is a detail sectional view, showing the mechanism set for reverse, Fig. 4 is a sectional view through the gearing, showing the provision made for change of speed, taken on line 4—4 of Fig. 1, Fig. 5 is a detail sectional view of the guide for the operating lever, taken on line 5—5 of Fig. 4, Fig. 6 is a sectional view, showing the tooth of the operating lever in engagement with the recess in the guide, Fig. 7 is a detail sectional view of a modified construction, Fig. 8 is a plan sectional view on the line 8—8 of Fig. 7.

In the drawing, 2 represents the engine case and 3 a suitable housing thereon in which the transmission mechanism is mounted. A hub 4 is mounted on said housing and has a bearing 5 for the shaft 6 which extends through a housing and has a bearing 7 in the opposite side thereof. A hub 8 is splined on this shaft and is provided at one end with a clutch pinion 9 and at its opposite end with a series of teeth 10 which are adapted to slide through openings 11 provided in a beveled gear 12 that is splined on the shaft 6 and has a clutch pinion 13 of greater diameter than the pinion 9 loosely mounted thereon. The teeth of this pinion are in position to engage the teeth 10 when the hub 8 is moved to project the said teeth 10 through the openings 11 for engaging and locking the clutch pinion 13 temporarily. This pinion 13 being larger than the pinion 9, will cause the operation of the machine at a different speed. The clutch pinions 9 and 13 are arranged to mesh respectively with transmission gears 14 and 15 mounted on a shaft 16 having sprocket wheels 17 thereon for driving connection with the wheels of the machine. The gear 12 is operated through a beveled pinion 18 from the engine case. For shifting the gears we provide a shaft 19 mounted to slide in the walls of the housing and having an arm 20 thereon which engages an annular groove 21 in the hub 8. A lever 22 is mounted on the shaft 19 and is movable back and forth in a guide 24 having notches 25 on one side and a recess 26 on its opposite side. The lever has a collar 27 slidable thereon, controlled by means of a hand grip 28 and provided with projecting teeth 27' and 28'. There are three notches 25 in one edge of the guide to receive the tooth 28'. The end notches are for the two forward speeds and the intermediate notch for neutral. The intermediate notch is directly opposite the recess 26 on the other side of the guide, so that the lever, before entering this recess, must be set in its neutral position. There is, therefore, no danger of damage to the mechanism should a person in haste attempt to shift the gears of the lever; though it may be adjusted for either forward speed, it must be moved to a neutral position with the forward speed gears disengaged before it can be set to reverse.

On each side of the recess 26 lugs 28'' are provided, which engage the teeth 27' when the lever is moved into said recess for the purpose of locking said lever in its reversed position.

A yoke 29 is mounted on the shaft 23 and carries a wide face gear 30 that is adapted to swing with said yoke toward or from the teeth of the gear 14 and the shaft 19 has a collar 31 thereon provided with teeth 32 which mesh with comparatively long teeth 33 provided on the yoke 29. These teeth 33 with their wide bearing face remain in contact with the teeth 32 throughout the shifting movement of the shaft 19 on which the said collar is mounted. For a forward drive, the gear 30 is in the position illustrated in Fig. 1, power being transmitted through either the pinion 9 or 13 to the gears 14 or 15, by shifting said lever and shaft to left or right, according to the speed desired. For the reverse movement, the lever is moved from the position shown in Fig. 5 into the recess 26 and locked therein by means of the engagement with the teeth 27 and the lugs 28″. This adjustment of the lever will rock the shaft 19 and swing the gear 30 into engagement with the gear 14. The drive will then be through the pinion 9 to the gear 30 and from thence to the gear 14 to reverse the machine.

In Figs. 7 and 8 we have shown a modified construction which consists in providing a shaft 23′ on which an arm 34 is loosely mounted for shifting the gear 9. The shaft 23′ is free to rock in said arm and slide therewith in the bearing in the wall of the case, as shown in Fig. 8. A yoke 35 has its hub splined on said shaft 23′ and carries a pinion 30 which, when the shaft is rocked, is moved into or out of engagement with the teeth of the gear 14. This pinion 30 has a wide face, so that it may mesh with the gear 14 and the pinion 9 when said pinion is in its neutral position and thus drive the gear 14 in the reverse direction.

We claim as our invention:

1. In a transmission gearing, a shaft, a driving gear secured thereon, transmission gears mounted upon opposite sides of said driving gear, a clutch pinion for one of said gears, a transmission pinion mounted to move into engagement with the transmission gear on one side of said driving gear for one speed and through the driving gear into mesh with said clutch pinion on the other side of said driving gear for another speed, a shaft mounted for longitudinal movement and connected with said transmission pinion, a lever mounted on said shaft, a notched guide for said lever, and a locking device mounted on said lever and having a tooth to enter the notches in said guide.

2. In a transmission gearing, a shaft, a driving gear secured thereon, transmission gears mounted upon opposite sides of said driving gear, a clutch pinion for one of said gears, a transmission pinion mounted to move into engagement with the transmission gear on one side of said driving gear for one speed and through said driving gear into mesh with said clutch pinion on the other side of said driving gear for another speed, a rock shaft, and operating lever therefor, a pinion carried by said rock shaft for engagement with one of said transmission gears and said transmission pinion for reverse movement.

3. In a transmission gearing, a shaft, a driving gear secured thereon, transmission gears and a transmission pinion mounted to connect either of said transmission gears with said driving gear, a reverse pinion mounted to simultaneously mesh with one of said transmission gears and said transmission pinion for reverse movement, an operating lever for said pinion and a guide for said lever having means for compelling it to be moved to its neutral position before being set for reverse.

4. In a transmission gearing, a shaft, a driving gear secured thereon, transmission gears and a transmission pinion mounted to connect either of said transmission gears with said driving gear, a rock shaft, a pinion connected therewith for simultaneous engagement with one of said transmission gears, and said transmission pinion for reverse, an operating lever for said shaft, a guide having forward speed and neutral notches therein, and a recess opposite said neutral notch, said lever having means for entering said notches and for locking it within said recess for reverse movement of said transmission gearing.

5. A transmission gearing comprising a shaft, a driving gear mounted thereon, a driven shaft, transmission gears mounted on said driven shaft, a transmission pinion splined on said first named shaft for transmitting power from said driving gear to either one of said transmission gears for different forward speeds, a rocking pinion mounted to simultaneously engage one of said transmission gears and said driving pinion for reverse movement, and an operating lever for said rocking pinion.

6. In a transmission gearing, a driving shaft, a driving gear, transmission gears for different forward speeds, a transmission pinion for connecting said driving gear alternately with said transmission gears, a sliding shaft connected with said transmission pinion, said shaft having a rocking movement independently of said transmission pinion, a reverse pinion carried by said sliding shaft to rock therewith and engage simultaneously said driving pinion and one of said transmission gears, and an operating lever for said sliding shaft.

7. In a transmission gearing, a shaft, a driving gear secured thereon, transmission gears and a transmission pinion mounted to connect either of said transmission gears with said driving gear, a pinion mounted for simultaneous engagement with one of said transmission gears and said transmission pinion for reverse, an operating lever for said pinion, a guide for said operating lever having notches in the ends thereof for forward movement and a neutral notch between said ends, and a recess opposite said neutral notch for adjustment of the lever for reverse and said guide compelling said lever to be moved to its neutral position before entering said recess for reverse movement.

8. In a transmission gearing, a shaft, a driving gear secured thereon, transmission gears mounted upon opposite sides of said driving gear, a clutch pinion engaging one of said gears, a transmission pinion mounted to move into engagement with the transmission gear on one side of said driving gear for one speed and through said driving gear into mesh with said clutch pinion on the other side of said driving gear for another speed, a pinion mounted for engagement with one of said transmission gears and said transmission pinion for reverse movement, and an operating lever for said reverse pinion.

9. In a transmission gearing, a shaft, a driving gear secured thereon, transmission gears mounted upon opposite sides of said driving gear, a clutch pinion for one of said transmission gears, a transmission pinion mounted to move into engagement with the transmission gear on one side of said driving gear for one speed and through said driving gear into mesh with said clutch pinion on the other side of said driving gear for another speed, a lever for operating said transmission pinion, a reverse mechanism, and means compelling the adjustment of said operating lever in a neutral position before being set for the reverse.

In witness whereof, we have hereunto set our hands this 7th day of December, 1917.

LEONARD NILSON.
HAROLD NILSON.